United States Patent
Kawasaki

(10) Patent No.: US 9,270,209 B2
(45) Date of Patent: Feb. 23, 2016

(54) SERVO APPARATUS, AND CONTROLLING METHOD OF SERVO APPARATUS

(71) Applicant: CANON KABUSHIKI KAISHA, Tokyo (JP)

(72) Inventor: Somei Kawasaki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 14/444,758

(22) Filed: Jul. 28, 2014

(65) Prior Publication Data

US 2015/0042256 A1 Feb. 12, 2015

(30) Foreign Application Priority Data

Aug. 6, 2013 (JP) .................................. 2013-162890

(51) Int. Cl.
```
G05B 23/00      (2006.01)
H02P 5/00       (2006.01)
G05B 19/19      (2006.01)
H02P 8/42       (2006.01)
H02P 31/00      (2006.01)
```
(52) U.S. Cl.
CPC .................. *H02P 5/00* (2013.01); *G05B 19/19* (2013.01); *H02P 8/42* (2013.01); *G05B 23/00* (2013.01); *H02P 31/00* (2013.01)

(58) Field of Classification Search
CPC ....................................................... G05B 23/00
USPC ............................................. 318/568.16, 567
See application file for complete search history.

(56) References Cited

U.S. PATENT DOCUMENTS

| | | | |
|---|---|---|---|
| 5,502,419 A | 3/1996 | Kawasaki et al. | |
| 5,629,696 A | 5/1997 | Kawasaki et al. | |
| 5,640,131 A | 6/1997 | Kawasaki et al. | |
| 6,909,410 B2 | 6/2005 | Kawasaki et al. | |
| 2002/0018409 A1* | 2/2002 | Fukumoto | 369/44.32 |
| 2007/0078564 A1* | 4/2007 | Hoshino et al. | 700/245 |

FOREIGN PATENT DOCUMENTS

JP          2002-165493 A       6/2002

* cited by examiner

*Primary Examiner* — Erick Glass
(74) *Attorney, Agent, or Firm* — Fitzpatrick, Cella, Harper & Scinto

(57) ABSTRACT

In a servo apparatus which comprises a motor, a shaft angle detecting unit and a controlling unit, and performs standard control of an angle position by a torque controlling method, it enables to perform driving control corresponding to a fraction multiple of a predetermined angular unit.

8 Claims, 9 Drawing Sheets

FIG. 5

| n | a | b | c | d | e | f | g | h |
|---|---|---|---|---|---|---|---|---|
| 1 | $\theta_0-\Delta$ | $\theta_0$ | $\theta_0$ | $\theta_0$ | $\theta_0$ | $\theta_0$ | $\theta_0$ | $\theta_0$ |
| 2 | $\theta_0+\Delta$ | $\theta_0+\Delta$ | $\theta_0+\Delta$ | $\theta_0+\Delta$ | $\theta_0+\Delta$ | $\theta_0+2\Delta$ | $\theta_0+2\Delta$ | $\theta_0+2\Delta$ |
| 3 | $\theta_0-\Delta$ | $\theta_0-\Delta$ | $\theta_0-\Delta$ | $\theta_0$ | $\theta_0$ | $\theta_0$ | $\theta_0$ | $\theta_0$ |
| 4 | $\theta_0+\Delta$ | $\theta_0+\Delta$ | $\theta_0+\Delta$ | $\theta_0+\Delta$ | $\theta_0+\Delta$ | $\theta_0+\Delta$ | $\theta_0+\Delta$ | $\theta_0+2\Delta$ |
| 5 | $\theta_0-\Delta$ | $\theta_0-\Delta$ | $\theta_0$ | $\theta_0$ | $\theta_0$ | $\theta_0$ | $\theta_0$ | $\theta_0$ |
| 6 | $\theta_0+\Delta$ | $\theta_0+\Delta$ | $\theta_0+\Delta$ | $\theta_0+\Delta$ | $\theta_0+\Delta$ | $\theta_0+\Delta$ | $\theta_0+2\Delta$ | $\theta_0+2\Delta$ |
| 7 | $\theta_0-\Delta$ | $\theta_0-\Delta$ | $\theta_0-\Delta$ | $\theta_0-\Delta$ | $\theta_0$ | $\theta_0$ | $\theta_0$ | $\theta_0$ |
| 8 | $\theta_0+\Delta$ | $\theta_0+\Delta$ | $\theta_0+\Delta$ | $\theta_0+\Delta$ | $\theta_0+\Delta$ | $\theta_0+\Delta$ | $\theta_0+\Delta$ | $\theta_0+\Delta$ |

FIG. 7

| n | a | b | c | d | e | f | g | h |
|---|---|---|---|---|---|---|---|---|
| 0 | θ1 | θ1+Δ | θ1+Δ | θ1+Δ | θ1+Δ | θ1+Δ | θ1+Δ | θ1+Δ |
| 1 | θ1 | θ1 | θ1 | θ1 | θ1 | θ1+Δ | θ1+Δ | θ1+Δ |
| 2 | θ1 | θ1 | θ1 | θ1+Δ | θ1+Δ | θ1+Δ | θ1+Δ | θ1+Δ |
| 3 | θ1 | θ1 | θ1 | θ1+Δ | θ1+Δ | θ1 | θ1 | θ1+Δ |
| 4 | θ1 | θ1 | θ1+Δ | θ1 | θ1+Δ | θ1+Δ | θ1+Δ | θ1+Δ |
| 5 | θ1 | θ1 | θ1 | θ1 | θ1+Δ | θ1+Δ | θ1+Δ | θ1+Δ |
| 6 | θ1 | θ1 | θ1 | θ1 | θ1 | θ1 | θ1+Δ | θ1+Δ |
| 7 | θ1 | θ1 | θ1 | θ1 | θ1 | θ1 | θ1 | θ1 |

SERVO APPARATUS, AND CONTROLLING METHOD OF SERVO APPARATUS

BACKGROUND OF THE INVENTION

1. Field of the Invention

The present invention relates to a servo apparatus which generates a driving instruction for driving a motor based on an input indicated angle, and provides the generated driving instruction to the motor to drive and control the motor, and relates to a controlling method of the servo apparatus.

2. Description of the Related Art

In recent years, for example, in a robotic cell apparatus which is equipped with a plurality of multi-joint robots and works just like a human, the number of the multi-joint robots tends to increase, and thus a small and inexpensive servo apparatus is required as the servo apparatus to be used for each joint of the multi-joint robot. For this reason, in the industrial multi-joint robot, a servo apparatus which has been developed from a servo apparatus for the purpose of hobby is often used as the servo apparatus for driving the joint of the robot.

The servo apparatus (e.g., "RS405CB" manufactured by Futaba Corporation) for the robot comprises, e.g., a brushless DC (direct current) motor, a potentiometer for detecting output rotation of the DC motor, and a controlling unit. More specifically, if an indicated angle is input by a serial signal according to the RS-485 (recommended standard 485) or the like, the controlling unit of the servo apparatus performs feedback control to the motor based on the detected angle from the potentiometer, and concurrently controls the angle position of the motor by a torque controlling (elastic controlling) method. Incidentally, the potentiometer detects a voltage change of a resistor in an analog manner, and performs AD (analog-to-digital) conversion to convert the detected voltage change (analog signal) into a digital signal with, e.g., 12 bits (4096 stages), thereby achieving resolution of 0.1 degrees (3600 stages).

Incidentally, to increase resolution of a shaft angle (also called shaft angle resolution, hereinafter), it is considered to also increase resolution of the AD conversion. However, even if the resolution of the AD conversion is further increased, it is impossible to increase the shaft angle resolution because the detected value is unreliable due to noises. Under the circumstances, it is hard to further increase the shaft angle resolution as long as noise reduction in the AD conversion is not remarkably improved.

On another front, Japanese Patent Application Laid-Open No. 2002-165493 proposes a stepping motor which enables micro-step driving. In this case, the stepping motor can perform position control of a shaft angle between full steps by changing over adjacent two full-step excitation states based on time ratio.

As for the relation between the indicated angle and the torque in the servo apparatus such as RS405CB manufactured by Futaba Corporation, it is impossible to perform the torque control of the angle position which is less than the resolution. On another front, in recent years, there is a case where it is required to mount a camera to the tip of the multi-joint robot and minutely move the tip position of the multi-joint robot based on the image taken by the camera during work or the like. For example, an image which was taken by the camera having 2048×1536 pixels at a distance of 50 mm has the pixel pitch of about 28 μm. However, for example, in a case where the distance of the joint moving at the tip position of the multi-joint robot is 200 mm from the tip position, if control is performed at the angle position of 0.1 mm, then the moving resolution thereof is about 350 μm. Therefore, even if the resolution in image recognition is two to three pixel pitches, it is required to set the resolution of the angle position control of the servo apparatus to at least ¼ or less.

On another front, since the stepping motor performs driving with angles obtained by equally dividing a mechanical angle (shaft angle) by an electrical angle, there is a problem that the stepping motor is not appropriate for a high-speed rotation operation. In this connection, in a case where the stepping motor which is difficult to perform the high-speed rotation operation is intended to be used for the industrial multi-joint robot, if a speed reducer lies therein, the driving speed of the stepping motor decreases as a whole, whereby production speed decreases resultingly. In order not to use the speed reducer to prevent such inconvenience, it is necessary to increase the output torque of the stepping motor. In such a case, when the stepping motor is mounted for the joint of the multi-joint robot, it is necessary to enlarge the size of the stepping motor itself in consideration of output performance, prevention of step out, and the like. Consequently, it is difficult to adopt the stepping motor from the aspect of mountability.

SUMMARY OF THE INVENTION

In consideration of such a problem as described above, the present invention aims to provide a servo apparatus which comprises a motor, a shaft angle detecting unit and a controlling unit, performs standard control of an angle position by a torque controlling method, and enables to perform driving control corresponding to a fraction multiple of a predetermined angular unit, and further aims to provide a controlling method of the servo apparatus.

The present invention is characterized by a servo apparatus comprising: a motor configured to output rotation; a shaft angle detecting unit configured to detect an angle change of a shaft rotating by the rotation output of the motor, for a predetermined angular unit; and a controlling unit configured to be able to perform standard control of, based on an input indicated angle, generating an integer multiple driving instruction corresponding to an integer multiple of the predetermined angular unit, and providing the generated integer multiple driving instruction to the motor to drive and control the motor, wherein the controlling unit can perform micro control of, based on the input indicated angle, providing, to the motor, a fraction multiple driving instruction in which instructions corresponding to the integer multiple of the predetermined angular unit are arranged to form a predetermined pattern with a predetermined period and an average value thereof corresponds to a fraction multiple of the predetermined angular unit, to drive and control the motor.

Further, the present invention is characterized by a controlling method for a servo apparatus, which comprises: a motor configured to output rotation; a shaft angle detecting unit configured to detect an angle change of a shaft rotating by the rotation output of the motor, for a predetermined angular unit; and a controlling unit configured to be able to perform standard control of, based on an input indicated angle, generating an integer multiple driving instruction corresponding to an integer multiple of the predetermined angular unit, and providing the generated integer multiple driving instruction to the motor to drive and control the motor, wherein the controlling unit carries out a micro controlling step to perform micro control of, based on the input indicated angle, providing, to the motor, a fraction multiple driving instruction in which instructions corresponding to the integer multiple of the predetermined angular unit are arranged to form a predetermined pattern with a predetermined period and an average value thereof corresponds to a fraction multiple of the predetermined angular unit, to drive and control the motor.

Further features of the present invention will become apparent from the following description of exemplary embodiments with reference to the attached drawings.

BRIEF DESCRIPTION OF THE DRAWINGS

FIG. 5 is a diagram illustrating an arrangement of driving instructions in the micro control.

FIG. 7 is a diagram illustrating expectation values of detection of shaft angle changes in the micro control.

DESCRIPTION OF THE EMBODIMENTS

Hereinafter, preferred embodiments of the present invention will be described with reference to FIGS. 1 to 9. Initially, a multi-joint (or articulated) robot to which a servo apparatus according to the present invention is applicable will be described with reference to FIG. 9.

Figure 9:
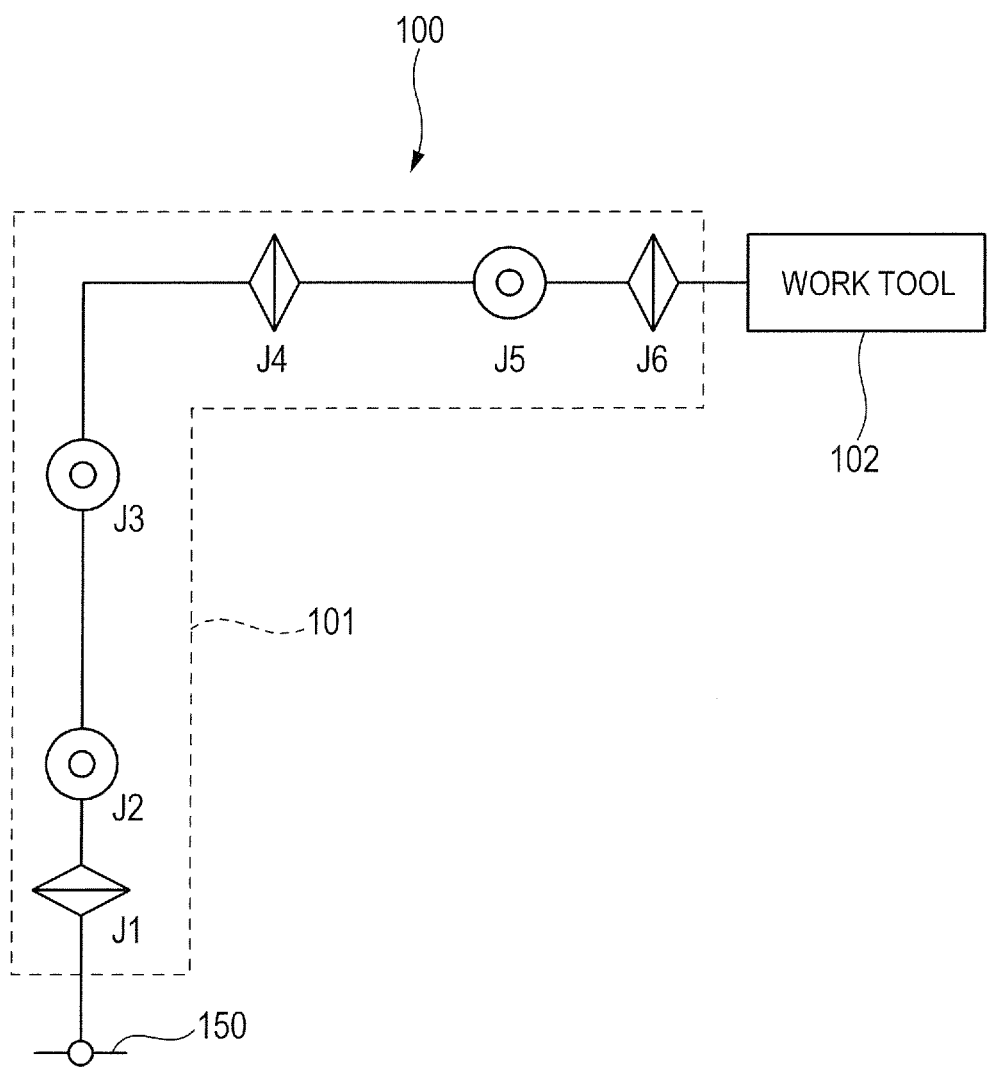
FIG. 9 is a schematic diagram illustrating an articulated robot to which the servo apparatus according to the present invention is applicable.

As illustrated in FIG. 9, a multi-joint robot 100 is constituted by a six-joint robot arm 101 located on a base 150 and a work tool (end effector) 102 fixed to (held at) the tip of the robot arm 101. A later-described servo apparatus 1 is incorporated in each of joint shafts J1 to J6 in the six-joint robot arm 101. The work tool 102 is, for example, a tool which performs desired working to a work or the like. For example, a camera (not illustrated) for imaging the work or the like is fixed and supported to the work tool.

As for the multi-joint robot 100, the angle position of each of the joint shafts J1 to J6 is driven and controlled by a not-illustrated controlling apparatus, based on a teaching point taught by a means such as a teaching pendant or the like for teaching a track or speed. That is, a signal of an indicated angle is provided to a later-described controlling unit 10 of the servo apparatus incorporated in each of the joints, from the not-illustrated controlling apparatus. In addition, an image of the work or the like imaged by the camera is transmitted to the not-illustrated controlling apparatus, and then a position/posture of the work or the like is calculated by a predetermined image process to the transmitted image. The not-illustrated controlling apparatus provides the signal of the indicated angle to each servo apparatus 1 so as to finely adjust the angle position of each of the joint shafts J1 to J6 based on the calculated position/posture of the work or the like such that the work tool 102 is set to a position suitable for the work. Incidentally, the present embodiment will be described on the premise that the servo apparatus 1 is incorporated in each of the joint shafts J1 to J6. However, it is also possible to perform later-described micro control if the servo apparatus 1 is incorporated in at least one of the joint shafts J1 to J6.

Figure 1:
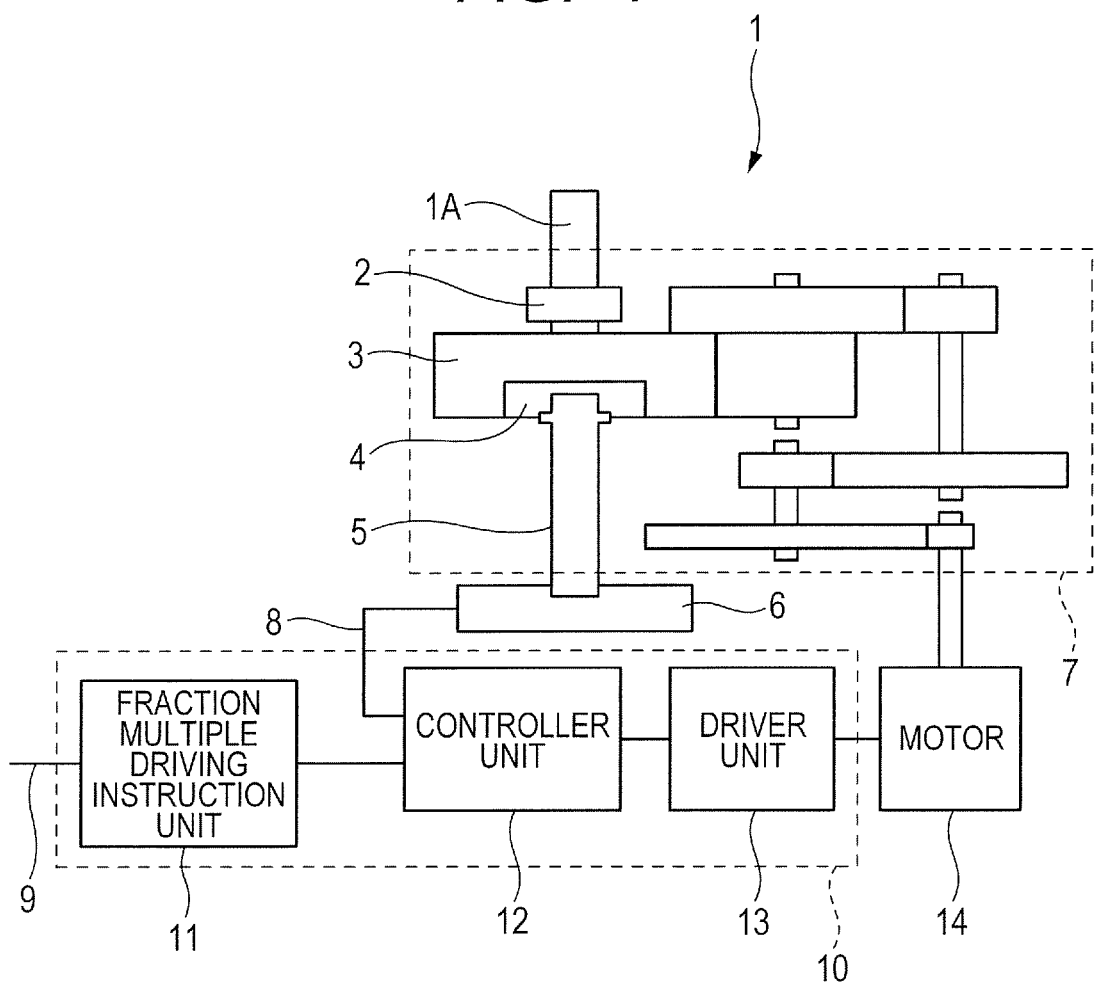
FIG. 1 is a block diagram illustrating a servo apparatus according to embodiments of the present invention.

Subsequently, an example of the servo apparatus 1 will be described with reference to FIG. 1. Roughly speaking, the servo apparatus 1 is constituted by a motor 14, a speed reducer 7, a potentiometer 6 and the controlling unit 10. The speed reducer 7 composed of eight gears reduces the rotation speed of the motor 14, transmits the reduced speed to an output shaft gear 3, and then outputs the rotation from an output shaft 1A connected to the output shaft gear 3. The output shaft 1A is rotatably supported with a servo housing by bearings 2 and 4 and also connected to a connecting shaft 5. That is, the output shaft 1A and the connecting shaft 5 are rotated by the rotation output of the motor and also connected to the potentiometer 6.

Figure 2:
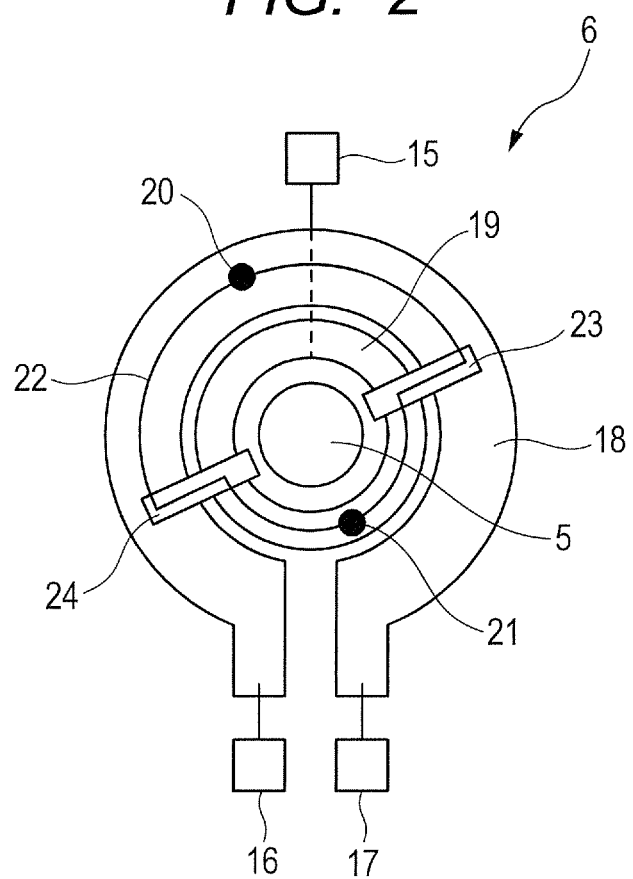
FIG. 2 is a diagram illustrating a constitution of a potentiometer.

As illustrated in FIG. 2, the potentiometer (shaft angle detecting unit) 6 comprises a resistor 19 positioned on the outer periphery of the connecting shaft 5, and a resistor 18 positioned on the further outer periphery of the resistor 19. In addition, support plates 23 and 24 are connected to the connecting shaft 5, and a conductor 22 is supported to the support plates 23 and 24. As for the conductor 22, a sliding portion 20 is slidably in contact with the resistor 18, and a sliding portion 21 is slidably in contact with the resistor 19. Further, reference voltage terminals 16 and 17 are connected to the resistor 18, and a shaft angle detecting terminal 15 is connected to the resistor 19.

Therefore, as for the potentiometer 6, if the connecting shaft 5 rotates, the sliding portions 20 and 21 rotate while respectively sliding along the resistors 18 and 19. Then, the voltage value of the resistor 19 is varied in an analog manner through the conductor 22 from that of the resistor 18 to which the reference voltage is applied by the reference voltage terminals 16 and 17, and a rotation change is output from the shaft angle detecting terminal (detector) 15 to a signal line 8 as an analog value.

The controlling unit 10 is constituted by a later-described fraction multiple driving instruction unit 11, a controller unit 12 and a driver unit 13. Moreover, the controlling unit 10 is connected to a signal line 9, which is connected to an input terminal for inputting the signal of the indicated angle by a serial communication standard such as RS485 (Recommended Standard 485) or the like. Also, the controlling unit 10 is connected so as to be able to freely transmit a driving instruction to the motor 14.

The above controlling unit 10 can perform standard control of performing driving control of the motor by a torque controlling method while performing feedback control based on the detected result of the potentiometer 6, and also perform the micro control according to the present invention. Here, the operation of the servo apparatus 1 to be performed when the standard control is performed will be described first. In the present embodiment, a case where the output shaft 1A of the servo apparatus 1 is driven and controlled with a level of an integer multiple of the shaft angle resolution (a predetermined angular unit) A to the resolving power of a shaft angle position which can be detected with the digital value after the AD conversion of the potentiometer 6 is called the standard control. On the other hand, a case where the output shaft 1A of the servo apparatus 1 is driven and controlled with a level of a fraction multiple of the shaft angle resolution Δ (i.e., minute as compared with the resolution of the potentiometer 6) is called the micro control. Here, it should be noted that "a predetermined angular unit" is equivalent to a unit of a predetermined angle.

In the standard control, for example, to the controller unit 12 of the controlling unit 10, a signal of an indicated angle θd calculated by the controlling apparatus of the multi-joint robot 100 is input from the signal line 9, and the above analog value is input from the shaft angle detecting terminal 15 of the potentiometer 6. The controller unit 12 performs AD conversion to the analog value input from the shaft angle detecting terminal 15 at the 12-bit level and generates the digital value being the predetermined angular unit. In this case, the controller unit 12 calculates an average value by averaging the digital values obtained by the predetermined number of AD conversions, and calculates a shaft angle θp of the shaft angle resolution Δ (i.e., the predetermined angular unit) having no fluctuation by using the average value as the shaft angle data of the output shaft 1A. Then, an output torque of the motor 14 is calculated from an angle difference (θp−θd) between the input indicated angle θd and the shaft angle θp detected by the potentiometer 6, and the calculated torque is transmitted to the driver unit 13. The driver unit 13 can drive and control the motor 14 by the torque controlling method, that is, by providing an integer multiple driving instruction of the shaft angle resolution Δ of the potentiometer 6 to the motor 14 based on the output torque of the motor 14 calculated by the controller unit 12.

Figure 3:
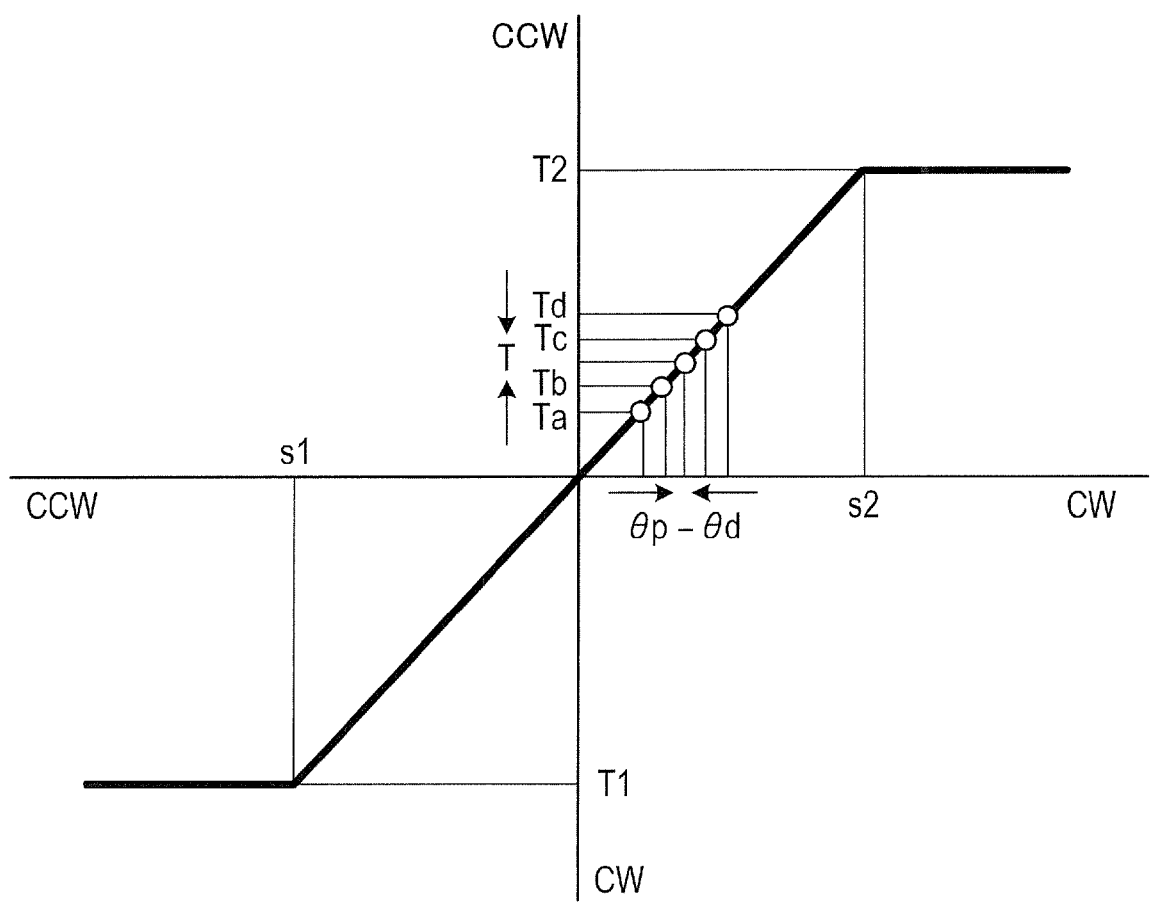
FIG. 3 is a diagram for describing relation between shaft angle errors and output torque in torque control of the servo apparatus.

Subsequently, the torque controlling method will be described in detail with reference to FIG. 3. In FIG. 3, the horizontal axis indicates the angle difference (θp−θd) between the indicated angle θd and the shaft angle θp, and the vertical axis indicates the output torque to be applied to the output shaft 1A for the angle difference (θp−θd). As for the directions of the angle difference and the output torque, the clockwise direction is denoted by CW and the counterclockwise direction is denoted by CCW. In the servo apparatus 1, at respective values s1 and s2 of the angle difference (θp−θd), the output torque is limited at T1 and T2 respectively.

For example, when the CW-direction torque T is applied to the output shaft 1A, the angle difference (θp−θd) occurs in the CW direction, and is counterbalanced at the shaft angle that the torque T is generated in the CCW direction. Since the servo apparatus 1 has "a spring characteristic" that the displacement is proportional to external force, this apparatus is also called an elastic control servo. Since torques T1 and T2 are the maximum torque, "a spring constant" indicating an inclination of the straight line is generally determined by the values s1 and s2 respectively. The values s1 and s2 and a shaft angle movement time tm can be properly set by the serial signal same as that for the indicated angle θd.

In the standard control of the servo apparatus 1, the torque control is performed in units of a torque control interval t0 shorter than the shaft angle movement time tm. Therefore, as the indicated angle actually used by the controller unit 12 in control timing, the interpolated indicated angle is used. Therefore, if the shaft angle movement time tm is shortened, as for the instantaneous torque, the torque is generated within the range of Ta and Td distant from the torque T and quickly converged on the torque T. On the contrary, if the shaft angle movement time tm is prolonged, the torque can be converged on the torque T within the range of Tb to Tc in the vicinity of the torque T.

In the multi-joint robot 100 which controls the servo apparatus 1 by this torque controlling method, an angle of each joint is not equal to the indicated angle due to external force. Therefore, the position or posture of the work tool 102 can be moved to the desired position or posture by recognizing it from the image including the work or the like with use of, e.g., a camera, and then, based on the recognized result, correcting the indicated angle for each the servo apparatus 1 with use of the controlling apparatus of the multi-joint robot 100. In the multi-joint robot 100 including the above torque-control servo apparatus, it is possible to achieve the robot control capable of flexibly coping with external factors (e.g., a weight change of the work, etc.) as compared with the case where a position control servo using the stepping motor or the like is used.

Subsequently, the micro control according to the present invention will be described. Incidentally, in the present embodiment, the number of arrangements for the fraction multiple is set as N=8. That is, a case of performing the micro control at x/8 (x is an integer) of the shaft angle resolution Δ (i.e., the predetermined angular unit) will be described.

Figure 4:
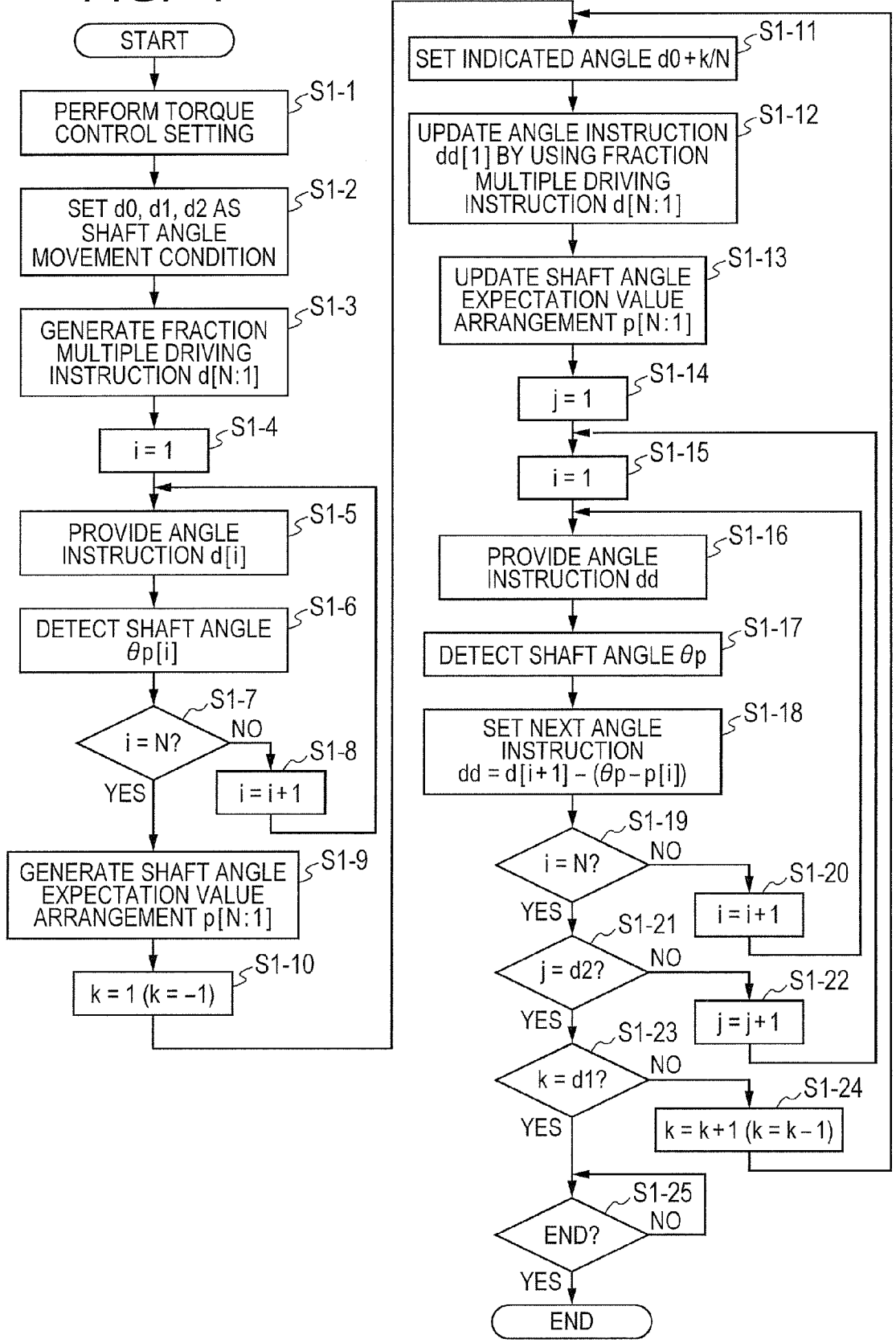
FIG. 4 is a flow chart for describing micro control of the servo apparatus.

As indicated in FIG. 4, when the controlling unit starts the micro control, in a step S1-1, the torque control setting in the controller unit 12 is performed. In the torque control setting, first, the values s1 and s2 for determining the "spring constant" and the shaft angle movement time tm are set. Here, it is desirable to set the values s1 and s2 to be closer to "0" (small value) as compared with the case of the standard control in order to improve sensitivity in the micro control. Also, in the torque control setting, a micro control interval tμ is set. Here, the micro control interval tμ is set to be equal to or larger than the torque control interval t0 of the servo apparatus 1.

Next, in a step S1-2, a start angle d0, a movement angle amount d1 and a shaft angle staying frequency d2 are set as the shaft angle movement conditions in the micro control. The start angle d0 is angle information which includes fraction values (x/8, x is in the range of 0 to 7) more precise than the shaft angle resolution Δ, and the movement angle amount d1 corresponds to a fraction value (every ⅛). Further, if it is assumed that the CW direction corresponds to a positive number and the CCW direction corresponds to a negative number, it is also possible to set the movement direction. Since a shaft angle staying time in the micro control is set by the shaft angle staying frequency d2, it is possible to set a shaft angle movement speed.

In a step S1-3, the fraction multiple driving instruction unit 11 of the controlling unit 10 generates a fraction multiple driving instruction d[8:1] arranged every shaft angle resolution Δ from the start angle d0. An example of the fraction multiple driving instruction d[8:1] is indicated in FIG. 5. In FIG. 5, "n" denotes an arrangement number, and "a" to "h" denote driving instruction value patterns for the motor 14 every fraction multiple (⅛ to ⅞) for the shaft angle resolution Δ.

Figure 6:
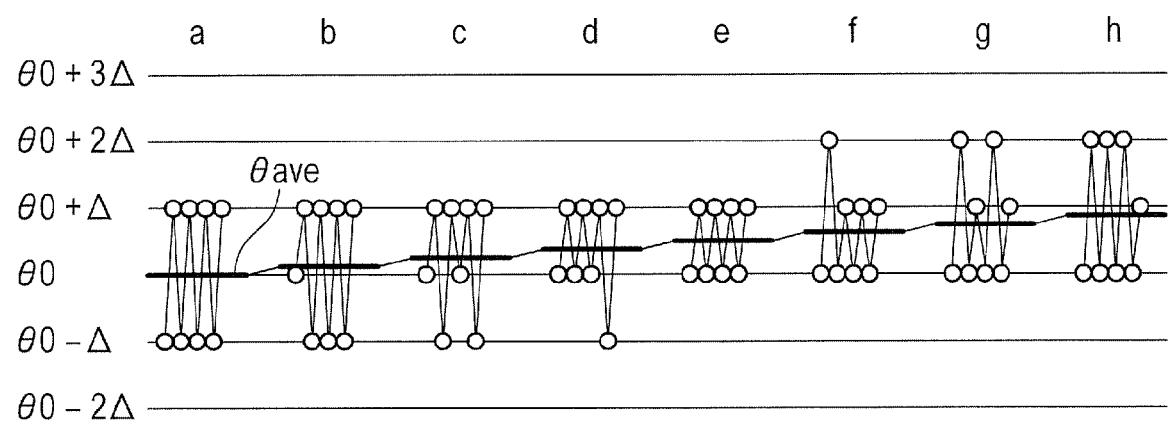
FIG. 6 is a time-series diagram illustrating the arrangement of the driving instructions of FIG. 5.

The fraction multiple driving instruction values in FIG. 5 will be illustrated in FIG. 6. Here, it should be noted that, in the drawing, the vertical axis direction represents the angle instruction and the horizontal axis direction represents time. As indicated in FIG. 6, the driving instruction patterns (predetermined patterns) every fraction multiple at the torque control interval t0 in the micro control are arranged so as to vibrate with a predetermined-period amplitude across the average value θave. The driving instruction value patterns of "a" to "h" respectively have the average values θave corresponding to the fraction multiples (⅛ to ⅞) according to their minute amplitudes. The driving instruction value patterns of "a" to "h" indicated in FIGS. 5 and 6 are examples that the change amount is suppressed as much as possible in the variation amplitude or the approximate fraction value, and examples that the amplitude variation is dispersed and the frequency component included in the amplitude variation is increased as much as possible. Incidentally, the driving instruction value patterns of "a" to "h" are not limited to the above arrangement, and the amplitude width is not limited to "Δ" or "2Δ".

In steps S1-4 to S1-8, for example, angle instructions d[i] according to the driving instruction value patterns of "a" to "h" of the fraction multiple driving instruction values indicated in FIG. 5 are sequentially provided to the motor 14 for the start angle d0, and the shaft angle θp[i] is detected and stored from the potentiometer 6 every time the angle instruction is provided. For example, i=1 is set in the step S1-4, an angle instruction d[1] is provided to the motor 14 in the step S1-5, and then a shaft angle θp[1] is detected and stored in the step S1-6 after the micro control interval tµ. Then, this operation is repeated until i=N (N=8 in the present embodiment) is obtained via the steps S1-7 and S1-8. Incidentally, to generate a later-described shaft angle expectation value arrangement, it is necessary to perform the above detecting and storing operations of the shaft angle θp[i] (the steps S1-4 to S1-8) by the number of times equal to or larger than the division number N of the fraction (eight times in the present embodiment). Thus, it is possible to know the status of the shaft angle θp including fluctuation at the start angle d0 when performing the micro control.

In the above process, if the micro control interval tµ is made smaller than the shaft angle movement time tm, the actual instructed angle becomes an interpolated angle, a minute torque is generated, and the oscillation of the shaft angle becomes sufficiently smaller than that of the shaft angle resolution Δ. The oscillation status of the shaft angle can be also set by the values s1 and s2 for determining "spring constant".

Subsequently, in a step S1-9, a shaft angle expectation value arrangement p[8:1] which is the average value of the shaft angle θp[i] calculated for the start angle d0 is calculated. Incidentally, it should be noted that the shaft angle expectation value arrangement p[N:1] is such an arrangement characterized in that the arrangement regarding the number of times of detecting the shaft angle change Δ by the potentiometer 6 in the micro control is recorded every driving instruction value pattern (that is, fraction multiple).

In particular, in the present embodiment, the minimum value θ1, the maximum value (θ1+Δ) and the number of "+Δ" at the minimum value θ1 are calculated among the above stored shaft angle θp[i]. Then, the shaft angle expectation value arrangement p[8:1] is generated every fraction multiple in correspondence with the maximum value (θ1+Δ) of the shaft angle.

As indicated in FIG. 7, in the shaft angle expectation value arrangement p[8:1], "n" denotes an arrangement number, and "a" to "h" correspond to the number of "+Δ" at the maximum value (θ1+Δ). In the present embodiment, to simplify the description, "a" to "h" of the shaft angle expectation value arrangement indicated in FIG. 7 are set to the same as the arrangement elements varying in regard to the "a" to "h" of the driving instruction value patterns in FIGS. 5 and 6.

Consequently, the driving angle of the motor 14 in the later-described micro control can easily follow the shaft angle variation responding to the angle instruction variation of the fraction multiple driving instruction d[8:1].

As for the shaft angle detection by the potentiometer 6, the shaft angle θp of the shaft angle resolution Δ without fluctuation is obtained by providing the average value of the predetermined-number AD conversions of the analog value as the digital value of the shaft angle in the above standard control. However, in the micro control, since a comparing operation to be performed with the shaft angle expectation value arrangement p[N:1] corresponds to the average value process, it is desirable to cancel the average value process of the digital value or reduce the number of times of the averaging. Thus, since it is possible to shorten the detecting time of the shaft angle θp and thus shorten the torque control interval t0, it is possible to shorten the micro control interval tµ.

As described above, when the various settings in the micro control are ended as the preparation step, the process advances to steps S1-10 and S1-11. In the step S1-10, as to the indicated angle, positive or negative of "k" is set considering positive or negative of the shaft angle movement amount d1. Here, k=1 is first set. In the step S1-11, the indicated angle d0+k/8 (d0−k/8 if negative) is set so as to be the value changed by only the fraction multiple of ⅛ of shaft angle.

Next, in a step S1-12, an angle instruction dd=d[1], which is the driving instruction pattern of the fraction multiple driving instruction, is updated for the indicated angle d0+k/8 (d0−k/8 if negative) by using the fraction multiple driving instruction d[8:1] indicated in FIGS. 5 and 6. In a case where the current indicated angle is at a position (h) of ⅞ of the shaft angle resolution Δ and the shaft angle is increased to 8/8 by the indicated angle d0+k/8, "+Δ" is added to each element of "a" of the driving instruction pattern, and the obtained result is used as the angle instruction. On the contrary, in a case where the current indicated angle is at a position (a) of 0/8 of the shaft angle resolution Δ and the shaft angle is decreased to ⅞ by the indicated angle d0−k/8, "−Δ" is added to each element of "h" of the driving instruction pattern, and the obtained result is used as the angle instruction.

Subsequently, in a step S1-13, a shaft angle expectation value is updated for the indicated angle d0+k/8 (d0−k/8 if negative) by using the shaft angle expectation value arrangement p[8:1] indicated in FIG. 7. In a case where the current shaft angle expectation value arrangement is at a position (h) of ⅞ of the shaft angle resolution Δ and the shaft angle is increased to 8/8 by the indicated angle d0+k/8, "+Δ" is added to each element of "a" of the shaft angle expectation value arrangement, and the obtained result is used as the shaft angle expectation value. On the contrary, in a case where the current shaft angle expectation value arrangement is at a position (a) of 0/8 of the shaft angle resolution Δ and the shaft angle is decreased to ⅞ by the indicated angle d0−k/8, "−Δ" is added to each element of "h" of the shaft angle expectation value arrangement, and the obtained result is used as the shaft angle expectation value.

Then, in steps S1-14 to S1-25, the motor 14 is actually driven by the fraction multiple driving instruction dd, the fraction multiple driving instruction dd is updated as needed while detecting the shaft angle θp so as to have the shaft angle expectation value arrangement set in the step S1-13, and the output shaft 1A is driven and controlled.

That is, first, j=1 is set in the step S1-14 and i=1 is set in the step S1-15. In the step S1-16, the fraction multiple driving instruction dd (here, d[1]) set in the step S1-12 is actually provided to the motor 14, and the output shaft 1A is driven and controlled. Next, after the micro control interval tµ, the shaft angle θp is detected by the potentiometer 6 in the step S1-17. Then, a next fraction multiple driving instruction dd is calculated and set by subtracting the difference between the shaft angle θp and a shaft angle expectation value arrangement p[1] from a next fraction multiple driving instruction d[2].

Thereafter, the motor 14 is driven and controlled by the fraction multiple driving instruction dd, which is updated as needed as described above, until reaching i=8 via the steps S1-19 and S1-20. Therefore, if the shaft angle θp is different for the shaft angle expectation value arrangement p[i], the next fraction multiple driving instruction dd is modified so as to correct the difference of the shaft angle θp.

The operations in the above steps S1-16 to S1-20 are repeated until the value j becomes the shaft angle staying frequency d2 via steps S1-21 and S1-22. In the above operation, although the average value of the fraction multiple driving instruction does not always become the fraction value of the indicated angle, the average value of the shaft angle θp comes close to the average value of the shaft angle expectation value arrangement p[N:1], that is, the movement angle of the shaft angle θp gradually comes close to the fraction multiple (x/8) of the shaft angle resolution Δ of the potentiometer 6. Thus, the fraction movement amount of the shaft angle, to which the driving instruction was given, is realized.

When the value j reaches the shaft angle staying frequency d2, one addition (k=k+1) or one subtraction (k=k−1) is performed until the value k reaches a movement angle amount d1 via steps S1-23 and S1-24, and this operation is repeated until reaching the indicated angle d0+d1/N. When the movement amount of the output shaft 1A detected by the potentiometer 6 reaches a shaft angle movement amount d1, a stand-by state is kept until the shaft angle movement time tm elapses in a step S1-25 without changing the fraction multiple driving instruction d[8:1] and the shaft angle expectation value arrangement p[8:1]. That is, the shaft angle θp is controlled so as to gradually come close to the shaft angle θp moved by only d1×(Δ/8) from the initial angle, and is held in that state. Then, the micro control is ended when the shaft angle movement time tm elapses.

According to the above driving control of the shaft angle by the micro control, as for the shaft angle θp, the shaft angle can be moved and held with the shaft angle resolution corresponding to the fraction multiple (about ⅛) of the shaft angle resolution Δ of the potentiometer 6. In addition, if the number of arrangements N of the fraction multiple driving instruction d[N:1] is increased, it is possible to perform the more precise driving control of the shaft angle, and it is further possible to improve the resolution of the shaft angle driving.

In the present embodiment, the fraction multiple driving instruction unit 11 is incorporated in the controlling unit 10. However, since it is unnecessary to integrate the fraction multiple driving instruction unit 11 and the servo apparatus 1 with each other, the fraction multiple driving instruction unit can be functioned as the controlling method of the servo apparatus for the conventional servo apparatus. In a case where the fraction multiple driving instruction unit 11 is integrally incorporated into the servo apparatus 1, if the start angle d0, the shaft angle movement amount d1 and the shaft angle staying frequency d2 are transmitted to the controlling unit 10 of the servo apparatus 1, then it is possible to easily perform the micro control.

In a case where the indicated angle data determined with the shaft angle resolution Δ of the potentiometer 6 is constituted by 12 bits, the indicated angle is generally transmitted to the servo apparatus 1 with two byte (16 bits). In the servo apparatus 1 to which the present invention is applied, if the number of arrangements of the fraction multiple driving instruction d[N:1] is set as N=8, three bits are assigned as the fraction value of the indicated angle, and one bit is assigned for a changeover between the micro control and the standard control. In this case, the total bit number of the indicated angle is equivalent to 16 bits as well as a general servo apparatus, and it is thus possible to perform the changeover between the micro control and the standard control. Since the above micro control including the fraction multiple driving instruction d[N:1] and the shaft angle expectation value arrangement p[N:1] can be achieved by software process as a whole, a cost increase necessary for integrally incorporating the fraction multiple driving instruction unit into the servo apparatus 1 almost never occurs.

Subsequently, a case where the multi-joint robot 100 is controlled by the combination of the micro control and the standard control will be described with reference to FIG. 8. As described above, in the micro control, since the output shaft 1A is minutely driven for the plural-time shaft angle control, the shaft angle movement speed is lower than that in the standard control. Therefore, as for the shaft angle driving operation for each joint performing the operation of the multi-joint robot 100, it is desirable to change over and use the standard control and the micro control. Hereinafter, the changeover between the standard control and the micro control will be described.

Figure 8:
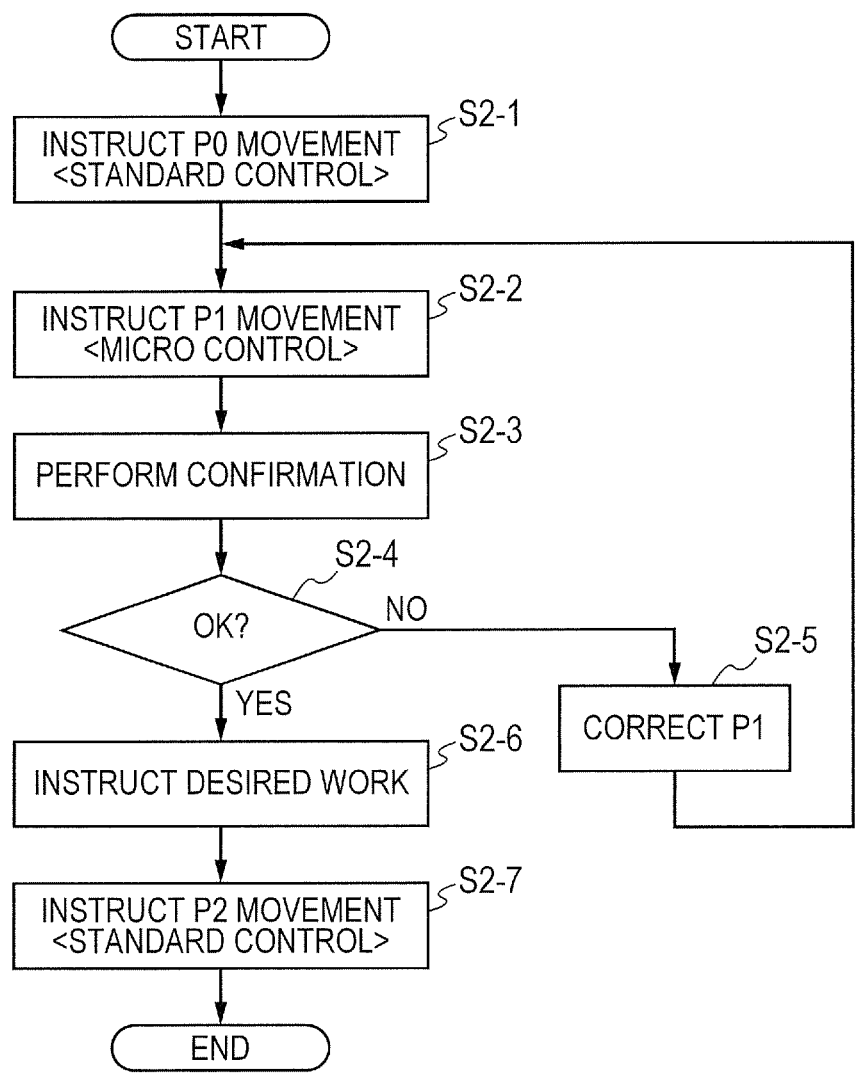
FIG. 8 is a flow chart for describing a changeover between standard control and the micro control.

As indicated in FIG. 8, in a step S2-1, the position/posture of a predetermined part of the work tool 102 is instructed from the controlling apparatus of the multi-joint robot 100 by the standard control, for example, as a position/posture P0 in the vicinity of the work starting condition. In this case, the servo apparatus 1 of each joint performs the shaft angle driving corresponding to the position/posture P0 by the standard control, and the predetermined part of the work tool 102 moves to the position being in the vicinity of the position/posture P0.

In a step S2-2, the position/posture of the predetermined part of the work tool 102 is instructed by the micro control so as to be a position/posture P1 of the work starting condition. Thus, the servo apparatus 1 of each joint performs the shaft angle driving corresponding to the position/posture P1 by the micro control. Next, in a step S2-3, the predetermined part of the work tool 102 or a predetermined position of an object (not illustrated) such as the work or the like are confirmed by a camera incorporated in the tip of the multi-joint robot 100 or another multi-joint robot. If the work starting condition is not satisfied in a step S2-4, the position/posture P1 is corrected in a step S2-5 based on the confirmed result such that the position/posture of the predetermined part of the work tool 102 satisfies the work starting condition. Since the servo apparatus 1 to be used adopts the torque controlling (elastic controlling) method, it serves as a force sensor which can recognize the external force applied to each servo apparatus 1 and the external force direction by the difference between a desired angle and the average value of the shaft angle θp. Consequently, it is possible to use the servo apparatus 1 as a confirming unit. Incidentally, the correcting operation of the position/posture P1 using the servo apparatus 1 as the force sensor is not always indispensable. Namely, only a correcting operation from the image recognition by the camera or the like may be performed.

If the position/posture of the work tool 102 for the object becomes satisfactory by the micro control, in a step S2-6, the desired work is performed to the object by the work tool 102. At this time, when the robot arm 101 of the multi-joint robot 100 is driven, the controlling method of each servo apparatus 1 may be the micro control or the standard control.

If the work by the work tool 102 is ended, the process advances to a step S2-7, and the position/posture of the predetermined part of the work tool 102 is again instructed as a position/posture P2 of the work stand-by condition or the like by the standard control. The servo apparatus 1 of each joint performs the shaft angle driving corresponding to the position/posture P2 by the standard control, so that the predetermined part of the work tool 102 moves to the position/posture P2.

In the above operation procedure of the multi-joint robot 100, since the micro control is used when each servo apparatus 1 performs the minute shaft angle driving operation, it is possible to achieve agility in the standard control and it is also possible to achieve the precise robot operation by the micro control, as the entire work.

Although the potentiometer 6 is used as the shaft angle detecting unit in the present embodiment as described above, the present invention is not limited to this. Namely, it may be possible to use any type of shaft angle detecting unit such as a resolver, a rotary encoder or the like, if it can detect the shaft angle of the output shaft 1A. Here, it is needless to say that, even if the resolver, the rotary encoder or the like is used as the shaft angle detecting unit, it is possible in the micro control to control the servo apparatus 1 with the fraction multiple of the resolution of the shaft angle detection.

According to the present invention, it is possible to perform the micro control for driving and controlling the motor by the fraction multiple driving instruction in which the average value is the fraction multiple of the predetermined angular unit. Thus, even if the stepping motor is not used, it is possible to provide the servo apparatus which can perform the driving control corresponding to the fraction multiple of the predetermined angular unit. In particular, it is possible to achieve the quick driving by the standard control, and it is also possible to achieve the minute driving by the micro control. Consequently, it is also possible to provide such a robot of achieving both the quick movement and the minute movement, for example, by applying the servo apparatus of the present invention to the joint of the robot.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-162890, filed Aug. 6, 2013, which is hereby incorporated by reference herein in its entirety.

What is claimed is:

1. A servo apparatus comprising:
 a motor configured to output rotation;
 a shaft angle detecting unit configured to detect an angle change of a shaft rotating by the rotation output of the motor, for a predetermined angular unit; and
 a controlling unit configured to be able to perform standard control of, based on an input indicated angle, generating an integer multiple driving instruction corresponding to an integer multiple of the predetermined angular unit, and providing the generated integer multiple driving instruction to the motor to drive and control the motor,
 wherein the controlling unit can perform micro control of, based on the input indicated angle, providing, to the motor, a fraction multiple driving instruction in which instructions corresponding to the integer multiple of the predetermined angular unit are arranged to form a predetermined pattern with a predetermined period and an average value thereof corresponds to a fraction multiple of the predetermined angular unit, to drive and control the motor.

2. The servo apparatus according to claim 1,
 wherein the controlling unit has an expectation value arrangement in which an arrangement concerning number of times of detecting the angle change of the shaft by the shaft angle detecting unit while the micro control is being performed is recorded for each fraction multiple, and
 wherein, in case of providing the fraction multiple driving instruction to the motor based on the input indicated angle, the controlling unit updates the fraction multiple driving instruction such that a difference between the expectation value arrangement and the number of times of the angle change of the shaft detected by the shaft angle detecting unit comes close.

3. The servo apparatus according to claim 1,
 wherein the shaft angle detecting unit comprises a detector configured to detect a rotation change of the shaft as an analog value, and
 wherein the controlling unit performs AD (analog-to-digital) conversion to convert the analog value into a digital value for each the predetermined angular unit, averages the digital values of a predetermined number in the standard control to generate a signal for each the predetermined angular unit, and makes the number of times of averaging the digital values in the micro control smaller than the predetermined number.

4. The servo apparatus according to claim 1, wherein the shaft angle detecting unit includes a potentiometer.

5. A multi-joint robot which comprises a servo apparatus for at least one joint thereof,
 wherein the servo apparatus includes the servo apparatus described in claim 1.

6. A controlling method for a servo apparatus, which comprises: a motor configured to output rotation; a shaft angle detecting unit configured to detect an angle change of a shaft rotating by the rotation output of the motor, for a predetermined angular unit; and a controlling unit configured to be able to perform standard control of, based on an input indicated angle, generating an integer multiple driving instruction corresponding to an integer multiple of the predetermined angular unit, and providing the generated integer multiple driving instruction to the motor to drive and control the motor,
 wherein the controlling unit carries out a micro controlling step to perform micro control of, based on the input indicated angle, providing, to the motor, a fraction multiple driving instruction in which instructions corresponding to the integer multiple of the predetermined angular unit are arranged to form a predetermined pattern with a predetermined period and an average value thereof corresponds to a fraction multiple of the predetermined angular unit, to drive and control the motor.

7. The controlling method according to claim 6,
 wherein the controlling unit has an expectation value arrangement in which information concerning number of times of detecting the angle change of the shaft by the shaft angle detecting unit while the micro control is being performed is recorded for each fraction multiple, and
 wherein, in case of providing the fraction multiple driving instruction to the motor based on the input indicated angle in the micro controlling step, the controlling unit updates the fraction multiple driving instruction such that a difference between the expectation value arrangement and the number of times of the angle change of the shaft detected by the shaft angle detecting unit comes close.

8. The controlling method according to claim 6,
 wherein the shaft angle detecting unit comprises a detector configured to detect a rotation change of the shaft as an analog value,
 wherein the controlling unit performs AD conversion to convert the analog value into a digital value for each the predetermined angular unit, and averages the digital values of a predetermined number in the standard control to generate a signal for each the predetermined angular unit, and
 wherein the controlling unit makes the number of times of averaging the digital values in the micro controlling step smaller than the predetermined number.

* * * * *